United States Patent
Mak et al.

(10) Patent No.: US 10,474,994 B2
(45) Date of Patent: Nov. 12, 2019

(54) COMPUTATIONALLY EFFICIENT RESTOCKING DISPLAY

(71) Applicant: Target Brands, Inc., Minneapolis, MN (US)

(72) Inventors: Kevin Mak, Darien, IL (US); Robert Edward Gilman, Otsego, MN (US); Molly Susan Condon, Minnetonka, MN (US); Mark Andrew Ganser, Woodbury, MN (US); Thomas Fitzgerald Jenny, Frederic, WI (US); Sarah Wolters Medrano, St. Paul, MN (US)

(73) Assignee: Target Brands, Inc., Minneapolis, MN (US)

( * ) Notice: Subject to any disclaimer, the term of this patent is extended or adjusted under 35 U.S.C. 154(b) by 722 days.

(21) Appl. No.: 15/019,515

(22) Filed: Feb. 9, 2016

(65) Prior Publication Data
US 2017/0228693 A1   Aug. 10, 2017

(51) Int. Cl.
*G06Q 10/08* (2012.01)
(52) U.S. Cl.
CPC ................ *G06Q 10/0875* (2013.01)
(58) Field of Classification Search
CPC ............ G06Q 10/0875; G06Q 20/203; G06Q 10/0631; G07F 7/00
USPC ..... 705/29, 28, 22, 7.12; 709/232, 241, 242; 707/769
See application file for complete search history.

(56) References Cited

U.S. PATENT DOCUMENTS

| | | | |
|---|---|---|---|
| 7,143,059 B2 | 11/2006 | Galli | |
| 7,667,602 B2 | 2/2010 | Ulrich | |
| 8,577,136 B1 | 11/2013 | Ascher et al. | |
| 9,024,755 B2 | 5/2015 | Fuhr et al. | |
| 2005/0086133 A1 | 4/2005 | Scherer et al. | |
| 2008/0319575 A1* | 12/2008 | Vahlberg | G06Q 10/087 700/232 |
| 2009/0204512 A1 | 8/2009 | Connell, II et al. | |
| 2010/0138037 A1* | 6/2010 | Adelberg | G06Q 10/087 700/241 |
| 2010/0138281 A1* | 6/2010 | Zhang | G06Q 10/087 705/28 |
| 2012/0166241 A1* | 6/2012 | Livingston | G06Q 10/0631 705/7.12 |
| 2012/0303154 A1* | 11/2012 | Stiernagle | G07F 9/023 700/214 |
| 2014/0195374 A1* | 7/2014 | Bassemir | G06Q 30/0639 705/26.8 |
| 2015/0294333 A1 | 10/2015 | Avegliano et al. | |

(Continued)

*Primary Examiner* — Vanel Frenel
(74) *Attorney, Agent, or Firm* — Theodore M. Magee; Westman, Champlin & Koehler, P.A.

(57) ABSTRACT

A computer-implemented method includes displaying a plurality of fill group identifiers and a map on a user interface. Each fill group identifier represents a separate collection of products that are restocked as a group, and the map has a plurality of flags, each flag indicating the location of a product that needs to be restocked. A request is received through the user interface to set a restocking task for one of the fill groups. When the restocking task is completed, the user interface is updated so that the fill group identifier associated with the request is removed from the user interface and the flags for any products in the fill group associated with the request are removed from the map.

20 Claims, 15 Drawing Sheets

(56) References Cited

U.S. PATENT DOCUMENTS

2015/0324725 A1* 11/2015 Roesbery ........... G06Q 30/0639
705/7.39
2016/0140168 A1* 5/2016 Rankin, Jr. ............ G06Q 10/10
707/769

* cited by examiner

COMPUTATIONALLY EFFICIENT RESTOCKING DISPLAY

BACKGROUND

In retail stores, inventory maintained in a backroom is brought onto a sales floor to replenish or restock shelves after consumers purchase products. In larger retail stores, tens of thousands of distinct product types are for sale and are disbursed across the retail store. As a result, it is impossible for a person to visually see which product types need restocking on the sales floor without walking through every aisle of the retail store. Even if a person were to walk through every aisle of the retail store, by the time they had walked through the store, additional products would need restocking.

The discussion above is merely provided for general background information and is not intended to be used as an aid in determining the scope of the claimed subject matter. The claimed subject matter is not limited to implementations that solve any or all disadvantages noted in the background.

SUMMARY

A computer-implemented method includes displaying a plurality of fill group identifiers and a map on a user interface. Each fill group identifier represents a separate collection of products that are restocked as a group, and the map has a plurality of flags, each flag indicating the location of a product that needs to be restocked. A request is received through the user interface to set a restocking task for one of the fill groups. When the restocking task is completed, the user interface is updated so that the fill group identifier associated with the request is removed from the user interface and the flags for any products in the fill group associated with the request are removed from the map.

In a further embodiment, a computer-implemented method includes displaying a user interface showing colored pins on a map and a list of fill groups. Each colored pin represents a location of at least one distinct product type that requires restocking and each fill group represents a respective collection of distinct product types where at least one of the distinct product types in the collection requires restocking. The color of the colored pins indicates a degree to which restocking is needed and two of the colored pins have different colors but represent locations of two respective product types of a single fill group. An instruction is received through the user interface to restock a fill group and in response to the received instruction a restocking task is set.

In a still further embodiment, a system includes a first mobile device configured to display a map indicating which products need restocking and to display a restocking request control for a fill group representing a collection of products that are restocked as a group. Upon selection of the restocking request control, the first mobile device transmits a restocking request for the fill group. A server is configured to receive the transmitted restocking request and in response cause a restocking task for the fill group to be transmitted. A second mobile device is configured to receive the transmitted restocking task and to display a user interface indicating the products in the fill group that need to be restocked as a group.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Because of the large number of product types available in retail stores, a textual list of all the product types requiring restocking often does not fit within the screen sizes available on mobile devices. Further, sending instructions to restock each product individually is computationally inefficient since it requires the sending of separate commands from the mobile device to a server and from the server to a further mobile device for each separate product that requires restocking. Further, it has not been possible to request restocking of one or more products while viewing a map showing the location of products requiring restocking. Instead, users have had to open a separate application on their mobile devices to request restocking. This results in an inefficient computing system in which the mobile device is required to keep two applications in memory.

Trying to maintain proper stocking levels without the use of a computer network has been ineffective. In many stores, rules are put in place that indicate dates and times when certain products are to be restocked. This has resulted in restocking tasks being assigned to some products when only one product unit has been sold. This wastes employee time and delays when the employee can restock items that have been truly depleted. The rule based system also results in empty shelves when demand is greater than expected. Having employees go around the store to check on inventory levels by hand results in sequential snap-shots of inventory levels because it takes time for the employees to check each shelf. During that time, the inventory level on other shelves is changing and is not reflected in the information collected by the employee. Thus a computer system is needed to produce an accurate view of the sales floor stock levels across an entire store.

Figure 1:
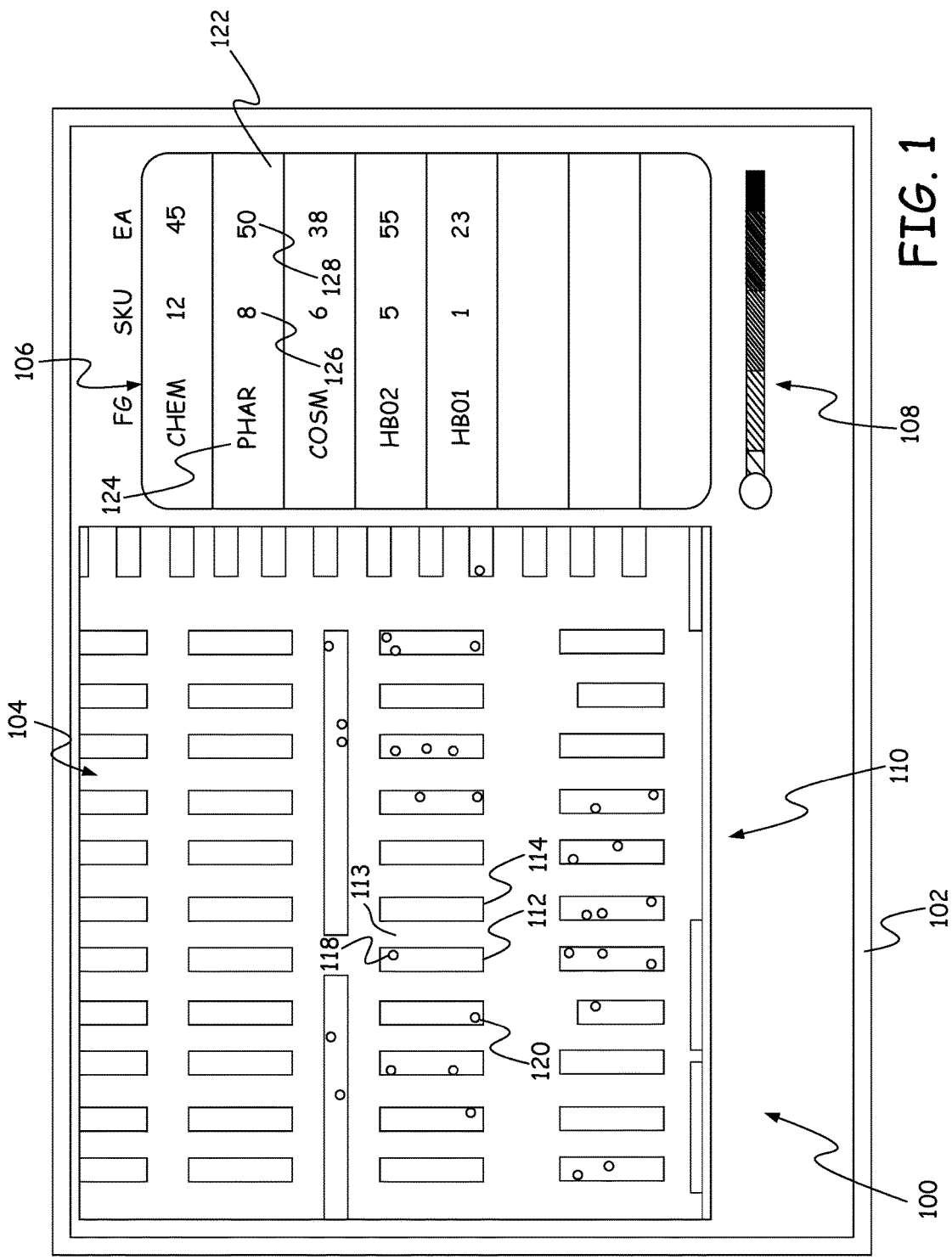
FIG. 1 provides a user interface displayed on a mobile device in accordance with one embodiment.

FIG. 1 provides a user interface 100 displayed on a mobile device 102. User interface 100 includes map 104, fill group list 106, restocking control 108, and product detail area 110. Map 104 shows a layout of shelves and aisles in a retail store, such as shelves 112 and 114, which are separated by aisle 113. On map 104, flags or pins, such as flags 118 and 120, show the location of products needing restocking. Fill group list 106 contains a list of fill groups, where a fill group is a collection of distinct product types that are restocked at a same time. For example, in FIG. 1, fill group list 106 includes five separate fill group entries for five respective fill groups. Each fill group entry, such as fill group entry 122, includes a fill group abbreviation, such as fill group abbreviation 124 ("PHAR", which is an abbreviation for pharmacy). Each fill group entry also includes a count of the number of distinct product types that require restocking in the fill group. For example, entry 122 includes a distinct product type count 126 equal "8". A distinct product type is a product with a collection of features that distinguish it from other product types in the store. For example, one product type may be a red nail polish from a particular brand having features of nail polish, red and brand X, while a second product type is a black nail polish from the same brand having features of nail polish, black and brand X. In general, each different product type is assigned a different ID by the retailer and this ID is sometimes referred to as a SKU. On the shelves, multiple units of a product type may be stocked.

Each fill group entry also includes a total unit count, such as total unit count 128 of entry 122. The total unit count is a count of the number of product units across all of the different product types that need restocking. For example, in entry 122, there are 8 distinct product types that need restocking and across those 8 distinct product types, 50 product units are required to fully restock the pharmacy fill group.

Restocking control 108 controls which flags appear on map 104 based on the degree to which restocking is needed for a product. Use of restocking control 108 is discussed further below. Product detail area 110 provides a space in which a product image and product information can be displayed when a flag is selected as described further below.

In FIG. 1, each of the flags is shown as being an empty circle. This depiction is used in FIG. 1 because the size of the circles do not permit distinguishing shading to be added to the circles. In several embodiments, each circle has one of a plurality of colors based on the degree of stocking needed for the product. For example, in one embodiment, there are 5 separate color values, each representing a different degree of restocking that is needed.

User interface 100 is interactive and changes based on input gestures from the user. In particular, the user may move map 104 to show different parts of the retail store by contacting the display at a position above map 104 and dragging across the display in the direction that map 104 is to move. Similarly, the user may zoom in and out of map 104 by applying gestures to the display of mobile device 102. Using these gestures, portions of the map can be hidden from view on the user interface such that some of the flags are not in view while other of the flags are in view.

Figure 2:
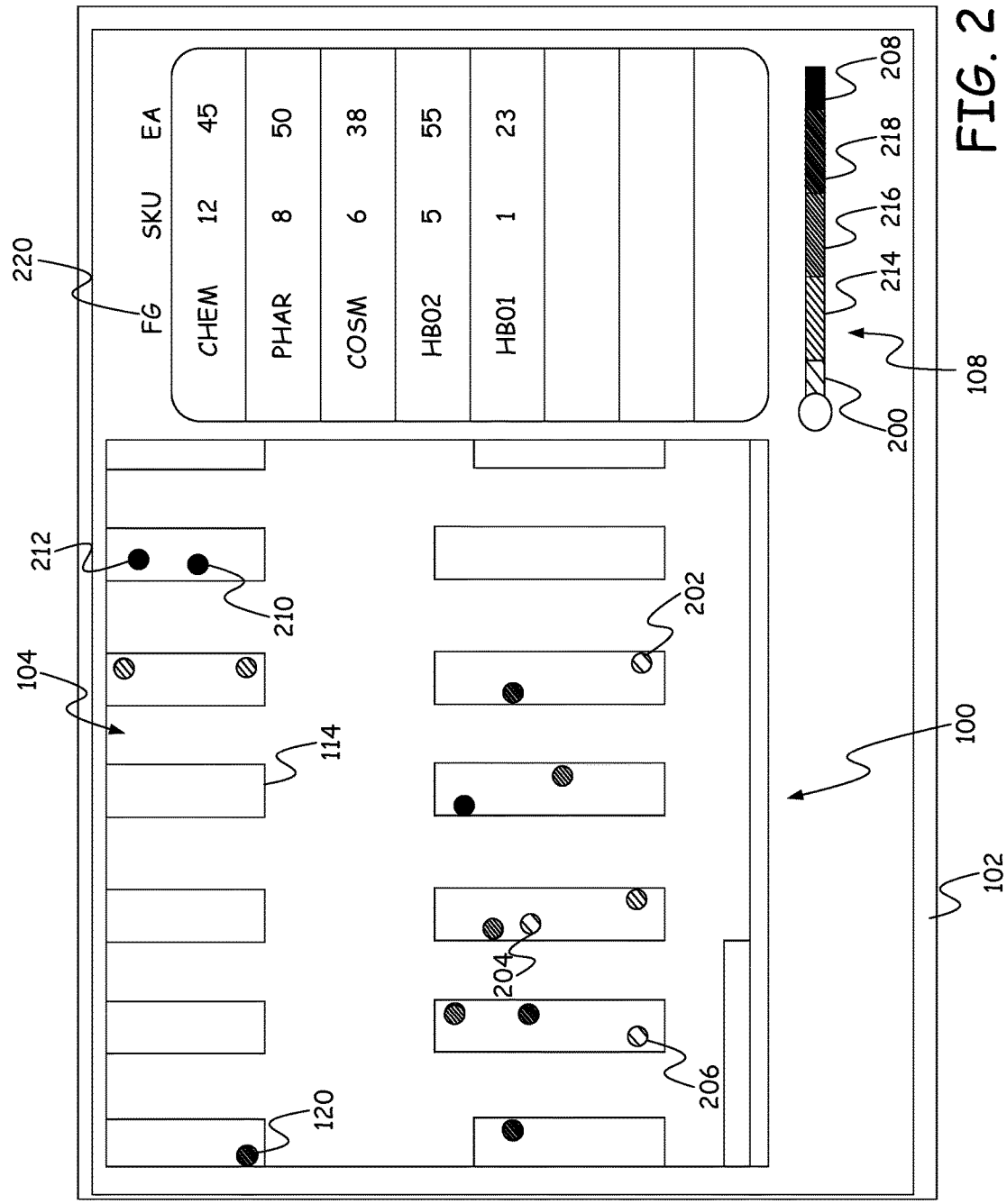
FIG. 2 provides a user interface displayed on a mobile device in accordance with one embodiment.

FIG. 2 shows user interface 100 after the user has zoomed into an area on map 104. In the expanded view of map 104 shown in FIG. 2, the flags can be seen to have different colors as indicated by the different shading. The colors correspond to colors shown on restocking control 108 with color 200 shown in flags 202, 204 and 206 representing the lowest degree of needed restocking and color 208 shown in flags 210 and 212 representing the highest degree of needed restocking. Colors 214, 216 and 218 represent sequentially increasing degrees of needed restocking.

In FIG. 2, each flag is for a separate distinct product type. In other embodiments, groups of distinct product types are represented by a single flag. In such embodiments, the flag is given the color of the product type with the highest degree of needed restocking. Representing more than one product type by a single flag is necessary because the screen size is so limited on mobile devices that the flags for different products would overlap on the map.

Figure 3:
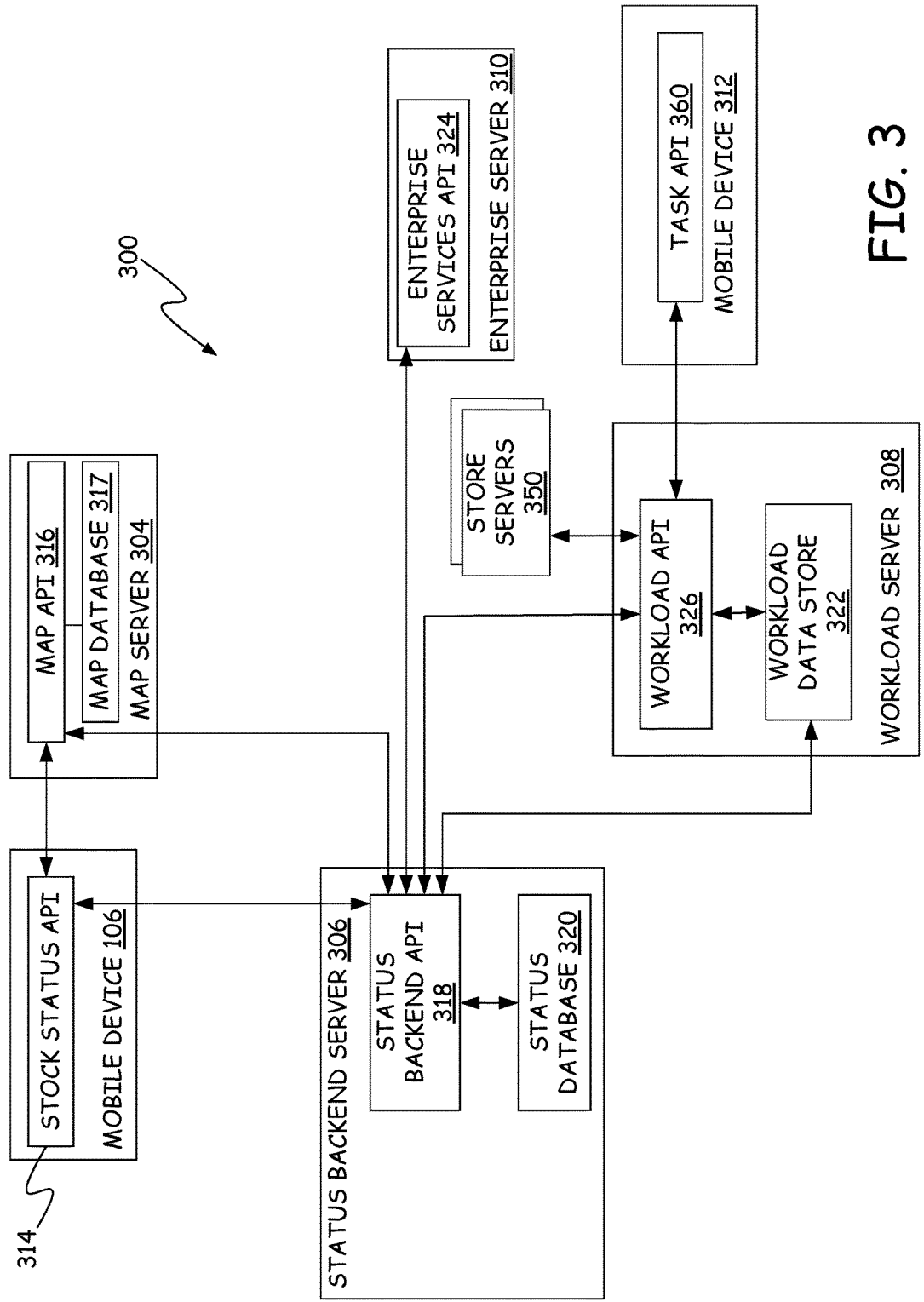
FIG. 3 provides a block diagram of a system in accordance with one embodiment.

FIG. 3 provides a block diagram of a system 300 used to produce user interface 100 on mobile device 102. System 300 includes mobile device 102, a map server 304, a status backend server 306, a workload server 308, an enterprise server 310, and store servers 350. User interface 100 is produced by a stock status API 314 on mobile device 106 based on information the stock status API 314 retrieves from a map API 316 on map server 304 and a status backend API 318 on status backend server 306. Map API 316 retrieves the information it sends to mobile device 102 from a map database 317 on map server 304. Status backend API 318 also retrieves information sent to stock status API 314 from a status database 320 on status backend server 306. The information stored on status database 320 is retrieved from map API 316, a workload datastore 322 on workload server 308 and from an enterprise service API 324 on enterprise server 310. The data on workload datastore 322 is produced by workload API 326, which communicates with status backend API 318 on status backend server 306.

Figure 4:
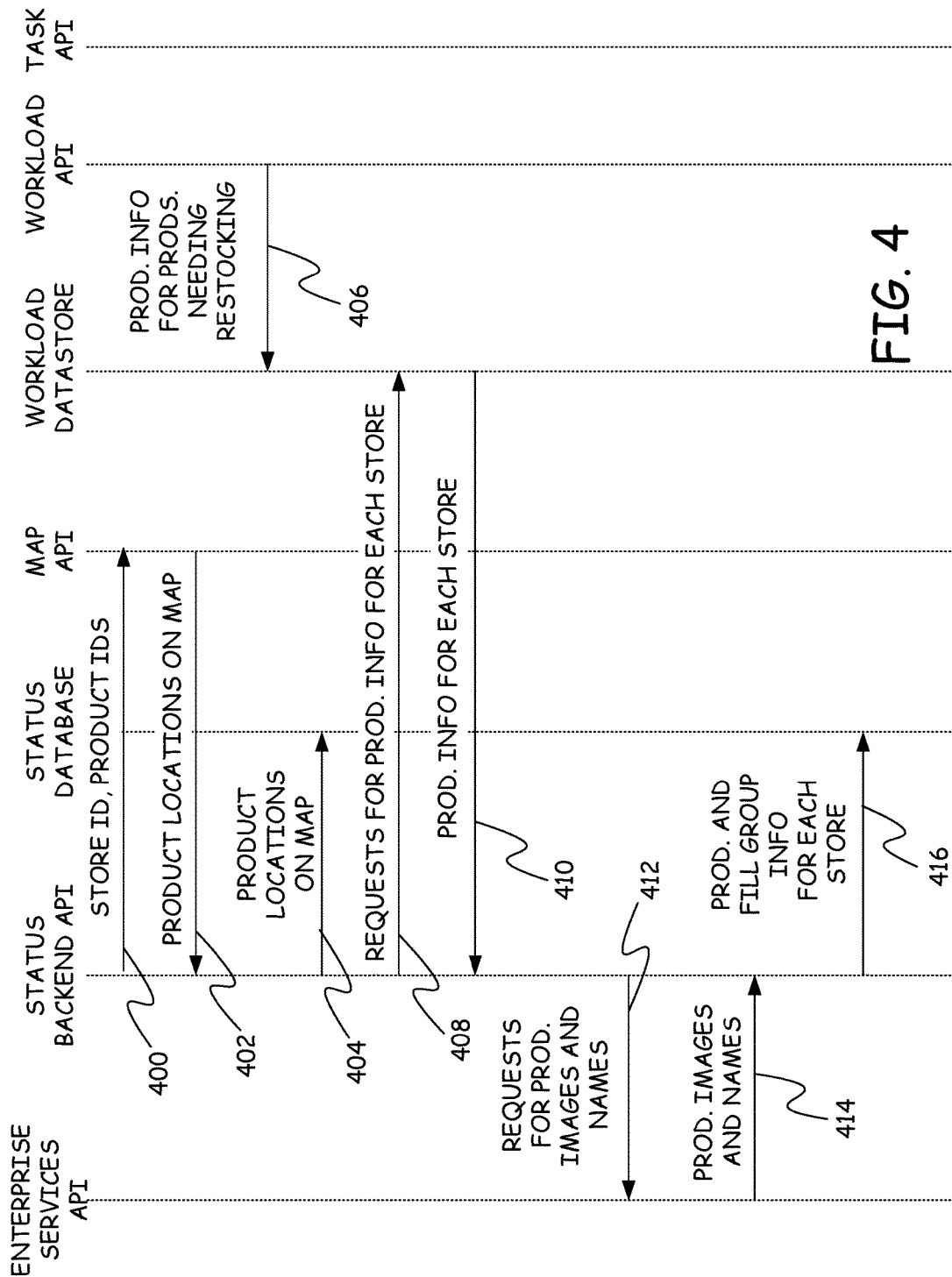
FIG. 4 provides a swimlane diagram showing information transmissions within the system of FIG. 3.

FIG. 4 provides a swimlane diagram showing the transmission of information between the various APIs, databases and datastores to prepare for a stock status request from stock status API 314 on mobile device 102. This preparation is done to reduce the response time needed to provide the current stock status to stock status API 314. In particular, prefetching the information about products that need restocking and their locations on the map of each store reduces the time required to provide such information to stock status API 314 on mobile device 102.

In step 400 of FIG. 4, status backend API 318 sends a store ID and product ID to map API 316. In response, at step 402, map API 316 returns the location of the corresponding product on a map of the corresponding store. Status backend API 318 repeats steps 400 and 402 for every product in every store. Instead of sending a separate request for each product, status back end API 318 may send a single request for a group of products and receive a single message in return at step 402 that contains each of the product's locations on the map.

Status backend API 318 stores the product locations in status database 320 at step 404. At step 406, workload API 326 determines which products need restocking in every store in the retail enterprise and stores product information for the products needing restocking in workload datastore 322.

Figure 5:
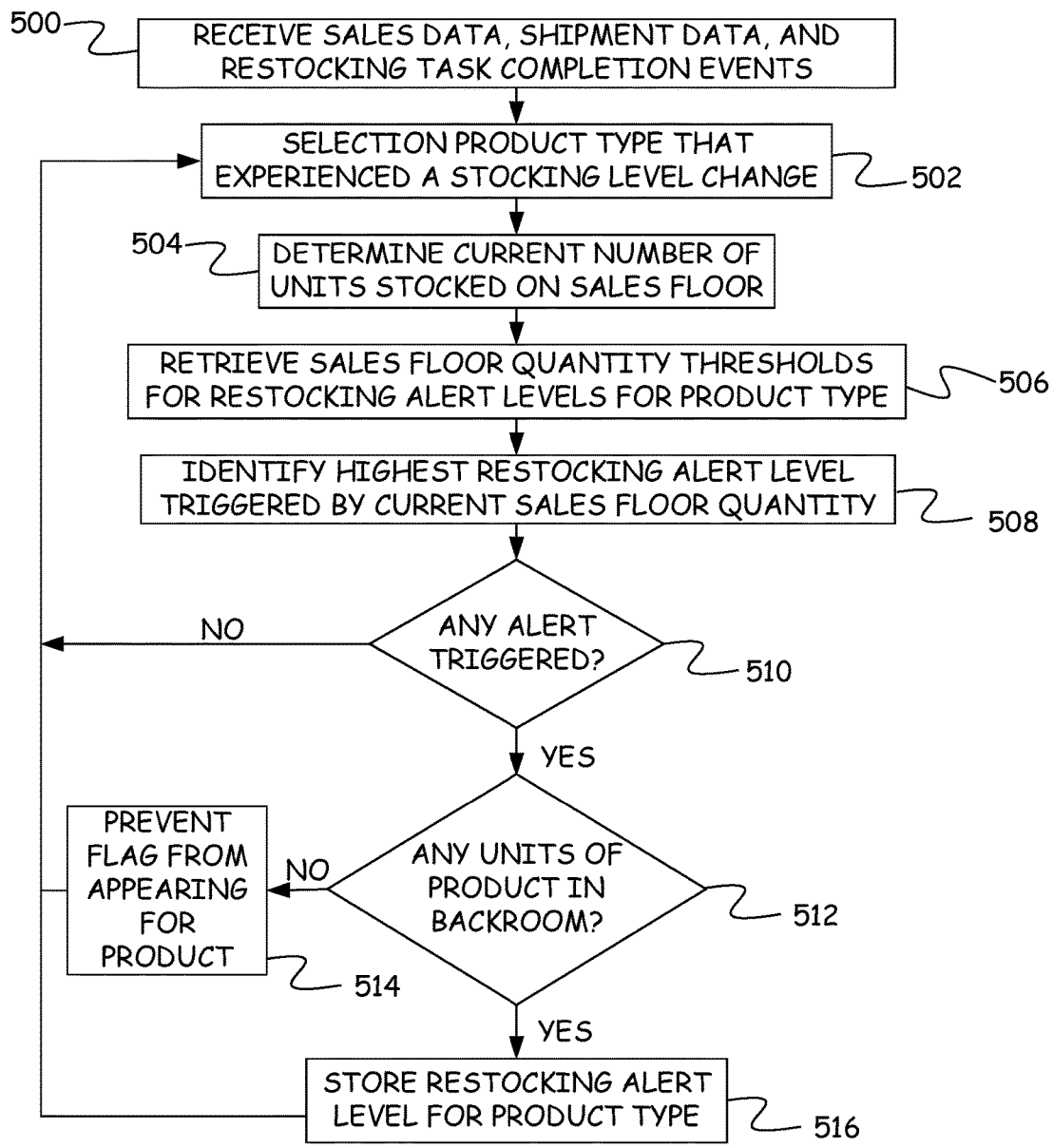
FIG. 5 provides a flow diagram of a method of generating restocking alerts.

FIG. 5 provides a flow diagram of a method used by workload API 326 to identify which products in a store need restocking and to set a restocking need level for each product. The restocking need level indicates the degree to which restocking is currently needed.

In step 500, workload API 326 receives sales data, shipments data, and completed restocking task data from a collection of store servers 350 and mobile devices 312. At step 502, workload API 326 selects a product type that experienced a stock level change either in the backroom or on the sales floor. Such stock level changes can include an increase in the number of units in the backroom due to the arrival of a shipment, an increase in the number of units on the sales floor due to the completion of a restocking task, or a decrease in the number of units due to the sale of one or more units.

At step 504, workload API 326 determines the current number of units stocked on the sales floor. This can be determined by, for example, keeping track of the number of products that were stocked on the sales floor during the last restocking and subtracting the number of products that have been sold since the last restocking. At step 506, workload API 326 retrieves from memory sales floor quantity thresholds for restocking alert levels for the product type. For example, in embodiments that use five different restocking alert levels, there are five different thresholds. Example thresholds include keeping the sales floor quantity above a presentation minimum plus two times the predicted sales for the day, keeping the sales floor quantity above the presentation minimum plus the predicted sales for the day, keeping the sales floor quantity above the presentation minimum for the product, keeping the sales floor quantity above a facing number plus predicted product sales for a day and keeping the sales floor quantity above the facing number. The facing number represents the number of product units for a distinct product type that span the front of the shelf area assigned to the product type. The presentation minimum for a product type is the facing number times the number of rows of product units behind the facing row that is considered to be a presentation minimum. Each product type has its own presentation minimum and facing number based on the current planogram of the retail store.

In general, the degree of needed restocking increases as the threshold level for the restocking alert drops. For example, the threshold requiring a presentation minimum plus two times predicted sales is the lowest restocking need since it is triggered when there is a large number of products on the shelf whereas the threshold that is triggered when the number of products becomes less than the facing number is the highest degree of restocking need because there are not enough units of the product on the sales floor to span the front row of the shelf.

At step 508, workload API 326 identifies the highest restocking need or alert level triggered by the current sales floor quantity. For example, if the sales floor quantity is less than the presentation minimum for the product but greater than the facing number plus the predicted product sales for the day, the sales floor quantity would trigger three different restocking alert levels including the presentation minimum, the presentation minimum plus predicted sales for a day and the presentation minimum plus two times predicted sales for a day. Of the three thresholds, the presentation minimum for the product is the highest restocking need and is thus identified in step 508 as the restocking need or alert level for the product.

At step 510, workload API 326 determines if any alerts have been triggered for the current product. If no alerts have been triggered, the process returns to step 502 and a new product type that experienced a stock level change is selected. If an alert was triggered at step 510, workload API 326 determines if any units of the product are available in the backroom at step 512. If there are no units of the product available in the backroom, workload API 326 prevents a flag from appearing for the product type at step 514 and returns to step 502 to select a new product. By preventing a flag from appearing for a product type that is not available in the backroom, embodiments herein make the computing system more efficient by not sending information for a product that cannot be restocked. This reduces the amount of data traffic sent over the network and thereby improves the operation of the network. Preventing a flag from appearing for a product type that is not available in the back room also reduces the amount of clutter shown on the map by not showing flags for products that cannot be restocked. Reducing such clutter is essential because the limited display size means that flags will crowd against each other if all of the flags for each product were shown at the same time.

If units of the product needing restocking are available in the backroom at step 512, the restocking alert level for the product type is stored in workload datastore 322 at step 516. The process then returns to step 502 to select a new product type. Through the method of FIG. 5, workload API 326 stores a restocking alert or need level for each product type in each store when the product type needs restocking and is available in the backroom. As part of storing the restocking alert for a product, workload API 326 also stores the number of units of the product that can be placed on the sales floor, the number of units of the product currently on the sales floor, the number of units of the product needed on the sales floor and the number of units of the product in the back room. In addition, workload API identifies a fill group for each product.

Returning to FIG. 4, status backend API 318 requests product information for each store at step 408. In accordance with one embodiment, this request involves a read request made to workload datastore 322, which has previously been modified by workload API 326 to include the product information. In response to the read request, workload datastore 322 provides the product information for each store at step 410.

At step 412, status backend API 318 requests product images and names for each product returned to it in step 410. This request is made to enterprise services API 324, which returns the product images and names at step 414. At step 416, status backend API 318 stores the product information and alert levels provided by workload datastore 322, the product location information provided by map API 316, and the product images and product names provided by enterprise services API 324 for each store in status database 320. The product information returned at step 406 by workload API 326 includes a fill group identifier or abbreviation for each product type that requires restocking. In addition, status backend API 318 also determines counts of distinct product types and total product units for each fill group based on the information from workload datastore 322. Status backend API 318 stores this additional fill group information with the product information in status database 320.

Workload API 326 continuously or at regular intervals performs step 406 to store information for products needing restocking in the workload data store 322. Similarly, status backend API 318 either continuously or at regular intervals requests the product information from the workload data store, requests the product images and names at step 412 and stores the product information and fill group information for each store at step 416. As such, status database 320 is refreshed at regular intervals so that it contains the latest information about product types and fill groups that need restocking in each store.

Figure 6:
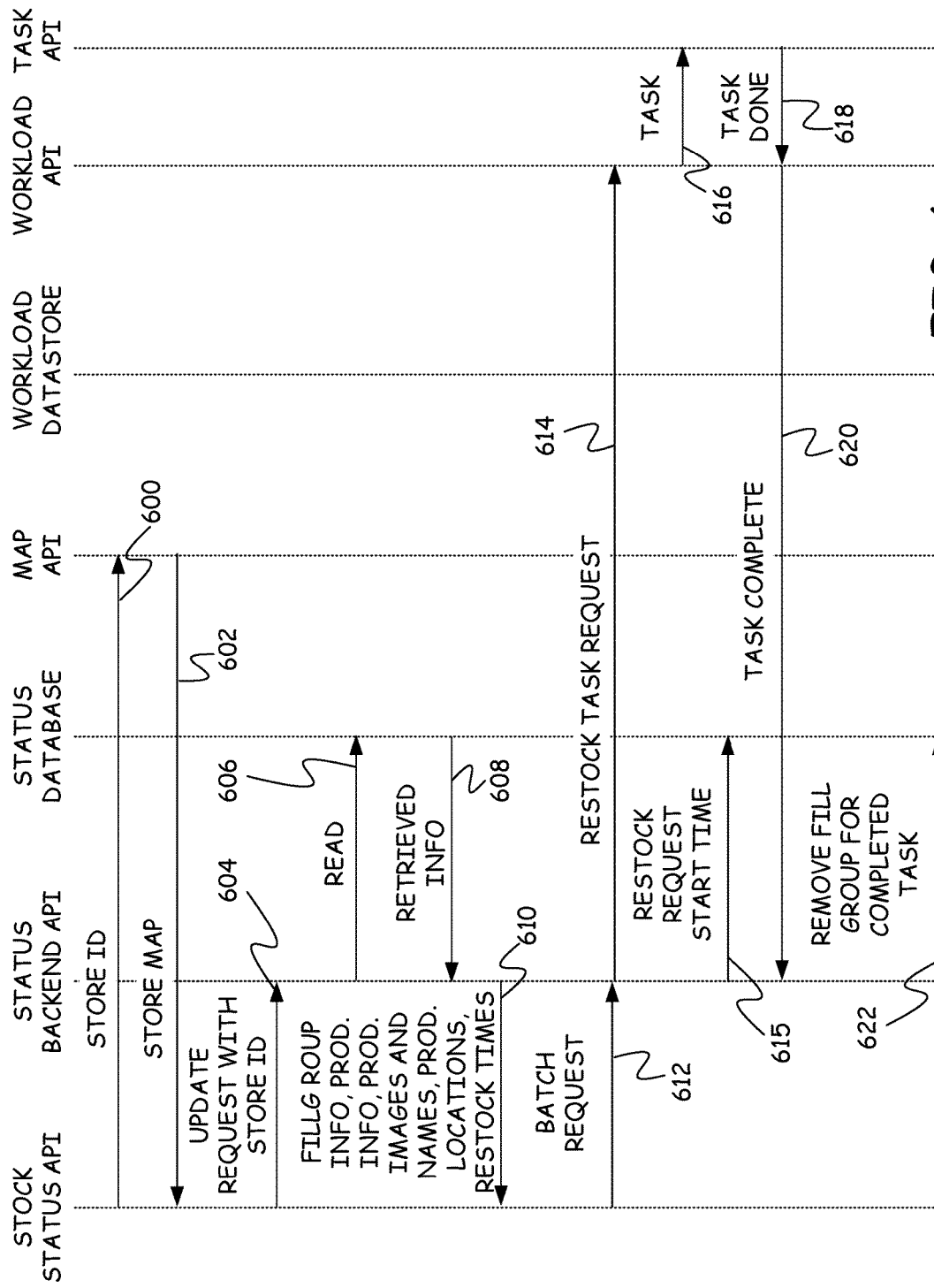
FIG. 6 provides a swimlane diagram of additional information transmissions in the system of FIG. 3.

FIG. 6 provides a swimlane diagram describing the transmission of information during the operation of stock status API 314 on mobile device 102. In step 600 of FIG. 6, stock status API 314 sends a store ID to map API 316 along with a request for the map of the store associated with the store ID. In accordance with one embodiment, the store ID is identified by stock status API 314 based on user login credentials. In accordance with such embodiment, each user is assigned to a particular store such that when they sign into mobile device 102 with their credentials, it is possible to identify which store the user will be working with. This store's ID is then provided to stock status API 314 which in turn provides it to map API 316. Based on the provided store ID, map API 316 returns the corresponding store map at step 602.

At step 604, stock status API 314 transmits a request for an update on the stocking status to status backend API 318. The update request is a request for the latest product and fill group restocking information stored in status database 320 for a store ID contained in the request. A user can trigger an update request by changing restocking control 108, by pulling down on a header 220 (FIG. 2) above fill group list 106 or by selecting a flag or a fill group entry.

Based on the received requests, status backend API 318 reads status database 320 at step 606 to retrieve the fill group information and product information for all products requiring restocking as identified by workload API 326. At step 608, this information is returned by status database 320. At step 610, status backend API 318 returns the fill group information, the product information, the product locations, the product images and names, and restock times for any restocking tasks that have previously been started. Such restock times are discussed further below.

Upon receiving the information at step 610, stock status API 314 updates user interface 100 to reflect the latest information. In particular, stock status API 314 uses the restocking need level of each product that requires restocking and the location of the product on the store map to place a flag for the product on the store map. The flag includes an indication of the degree of restocking needed for the product by, for example, setting the color for the flag. Stock status API 314 also updates fill group list 106 to include only the fill groups returned in step 610 and to indicate the current number of distinct products requiring restocking in each fill group and the total number of units requiring restocking in each fill group.

Figure 7:
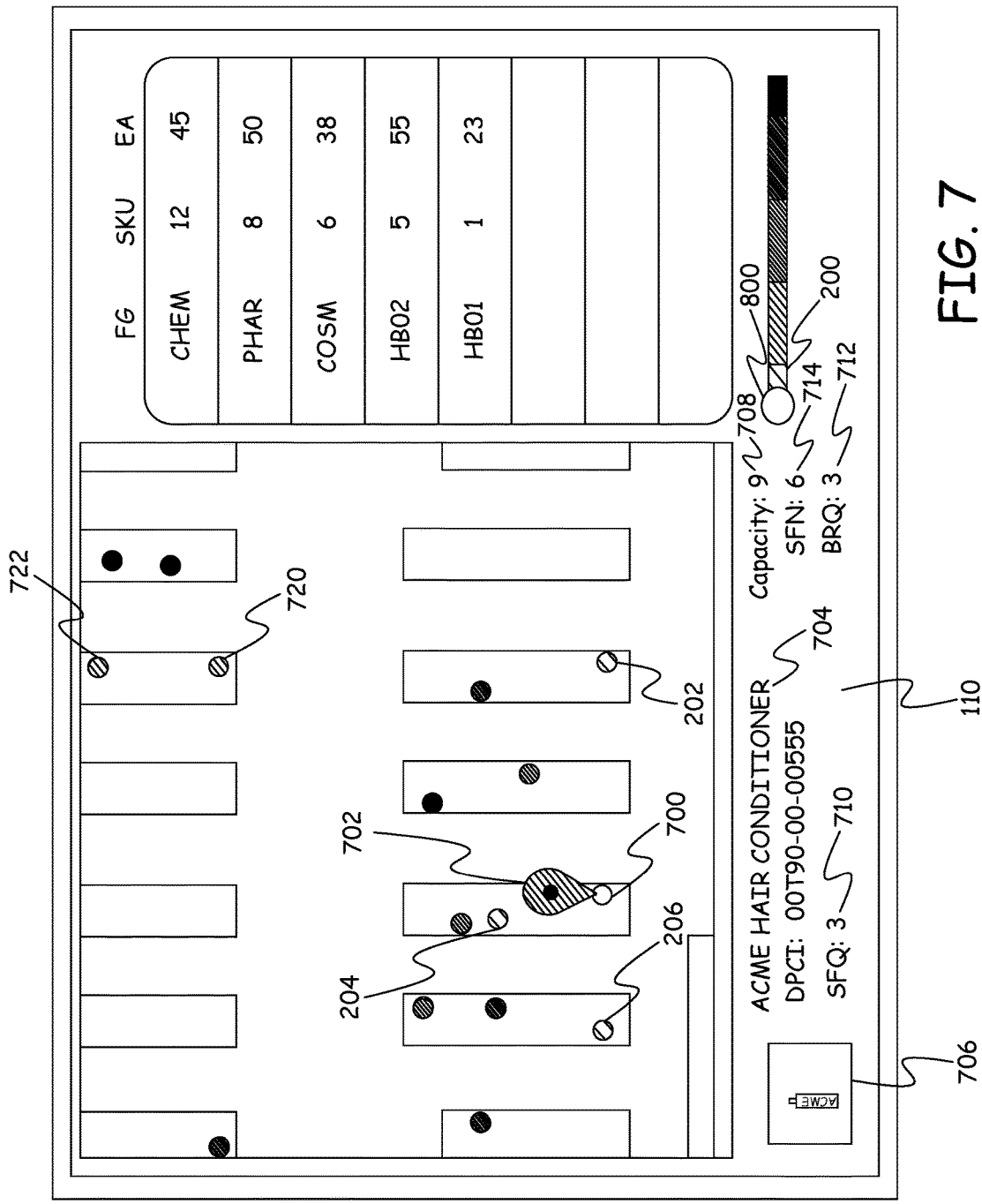
FIG. 7 provides a user interface on a mobile device showing the selection of a flag on a map.

Once stock status API 314 has updated the user interface based on the received the fill group information and the product information, stock status API 314 is able to respond to user interactions with user interface 100 in an efficient manner without communicating with status backend server 306. For example, if a user selects a flag 700 of FIG. 7, stock status API 314 is able to place a marker 702 over the flag and populate product detail area 110 with the product name 704, product image 706, sales floor capacity 708, current sales floor quantity 710, current backroom quantity 712 and sales floor need 714 without contacting status backend server 306. The sales floor capacity 708 is the total number of units of the product that can be placed on the sales floor. Sales floor need 714 is the difference between sales floor capacity 708 and the current sales floor quantity or number of units on the sales floor 710. Backroom quantity 712 is the number of units in the backroom.

In accordance with one embodiment, marker 702 is shown with the same color as flag 700. This provides a consistent message as to the restocking need of the product represented by flag 700 and makes it easier for the user to see the restocking need of the products since marker 702 is larger than flag 700.

Figure 8:
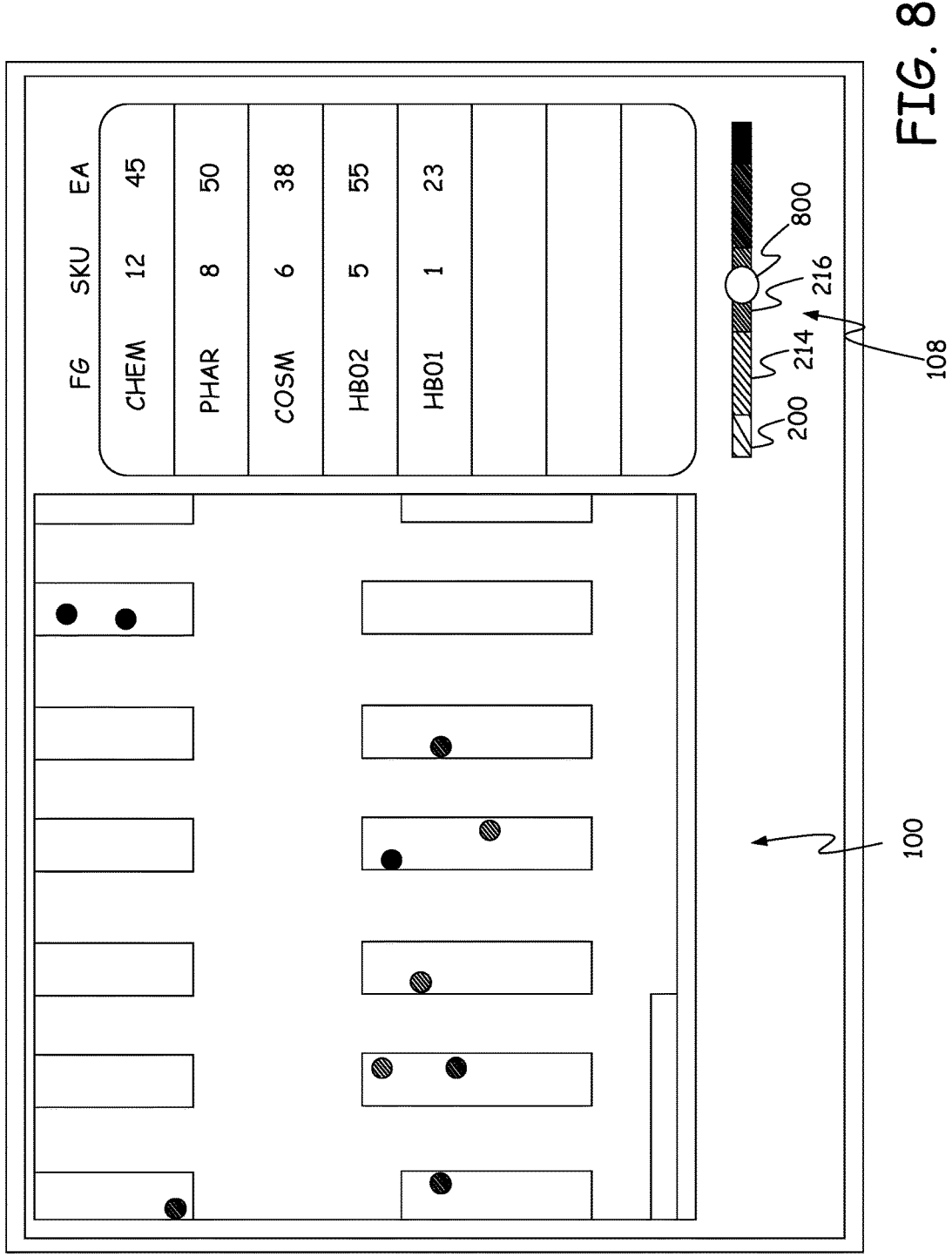
FIG. 8 provides a user interface showing on a mobile device after changing the alert level control.
Figure 9:
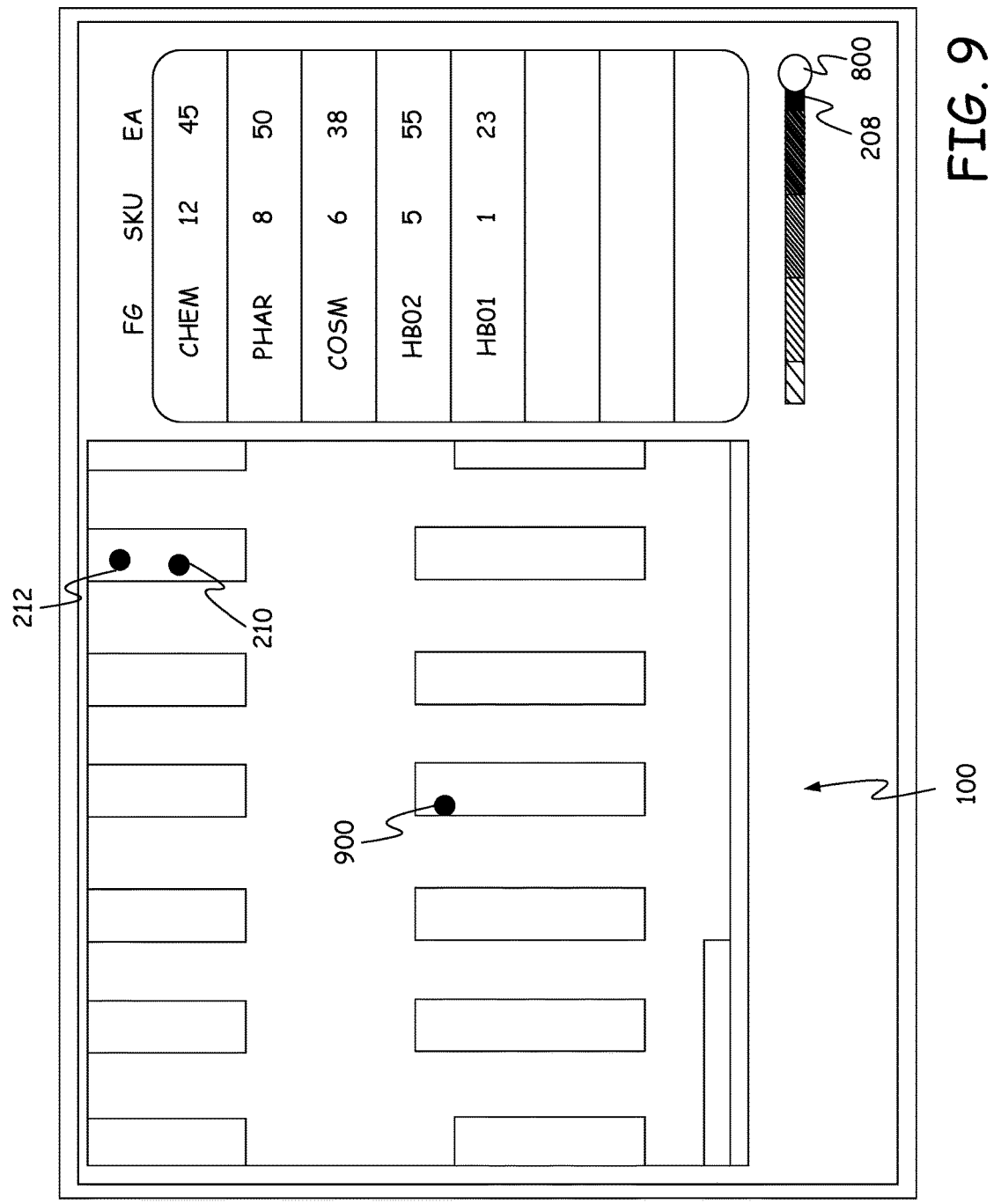
FIG. 9 shows a user interface on a mobile device after further changing the alert level control.

During busy times, the number of products requiring restocking can result in so many flags on map 104 that the user is overwhelmed and unable to process the information being conveyed. Restocking control 108 includes a slidable control 800, shown in FIG. 8, that can be moved to different restocking need levels so that only flags with a restocking need level at or above the current position of control 800 are shown on map 104. For example, comparing FIGS. 7 and 8, control 800 has been moved from the lowest restocking level indicated by color 200 to a middle restocking level indicated by color 216. As a result, flags for the restocking levels associated with colors 200 and 214 have been removed from user interface 100 in FIG. 8. In particular, flags 202, 204 and 206, which were for the lowest restocking alert level and flags 700, 720 and 722, which were for the second lowest restocking level associated with color 214 are not present in FIG. 8 but were present in FIG. 7. If controller 800 is moved further up as shown in FIG. 9, so that it is at the highest restocking alert level associated with 208, only flags for the highest restocking alert level are shown including flags 900, 210 and 212.

Figure 10:
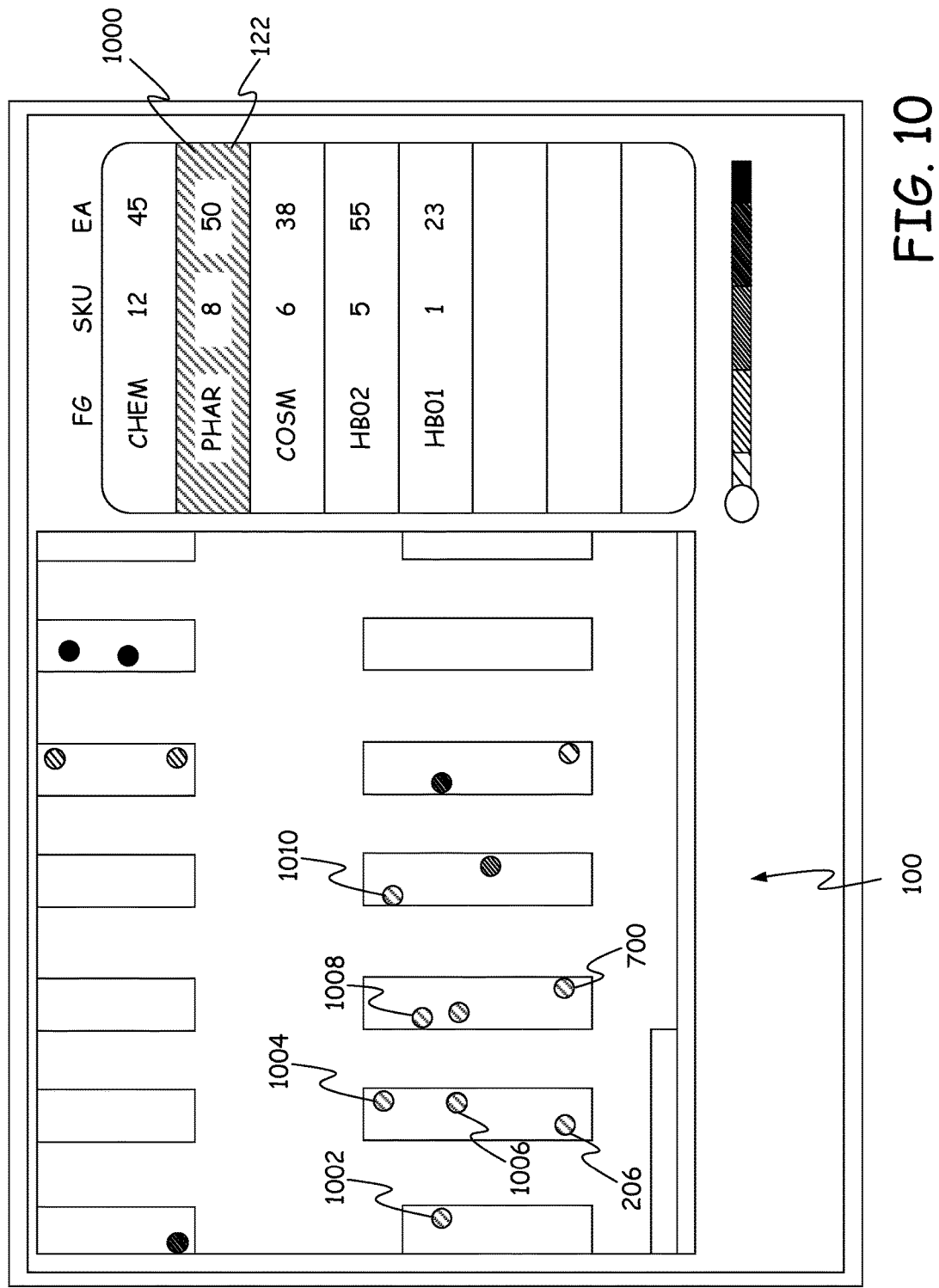
FIG. 10 provides a user interface on a mobile device after a selection of a fill group.

The different products that make up a fill group can have different restocking needs and as such the color of their flags or pins can be different. In order to allow the user to see all products associated with a single fill group, user interface 100 reacts to the selection of a fill group by setting a background around the fill group entry and each flag of a product in the fill group to the same color. For example, in FIG. 10, fill group entry 122 has been selected and as a result, stock status API 314 has changed the background color 1000 of the fill group and has changed the color of the flags of the eight products associated with the fill group, in particular, flags 1002, 1004, 1006, 1008, 1010, 204, 206 and 700 are changed to the same color as the color of background 1000. Thus, when a fill group entry is selected, the flags of the products in that fill group are changed from reflecting the degree of restocking needed for the product to a common color that links the flags together as being in the same selected fill group. This makes it possible for the user to see which fill group each product is in without generating a list of products on the user interface. Since mobile device screens have limited size, when large numbers of products require restocking in a fill group, it is possible for the list to be too large to display on the screen. By simply changing the color of the flags, this aspect of the present embodiments overcome this technical shortcoming of mobile devices.

Figure 11:
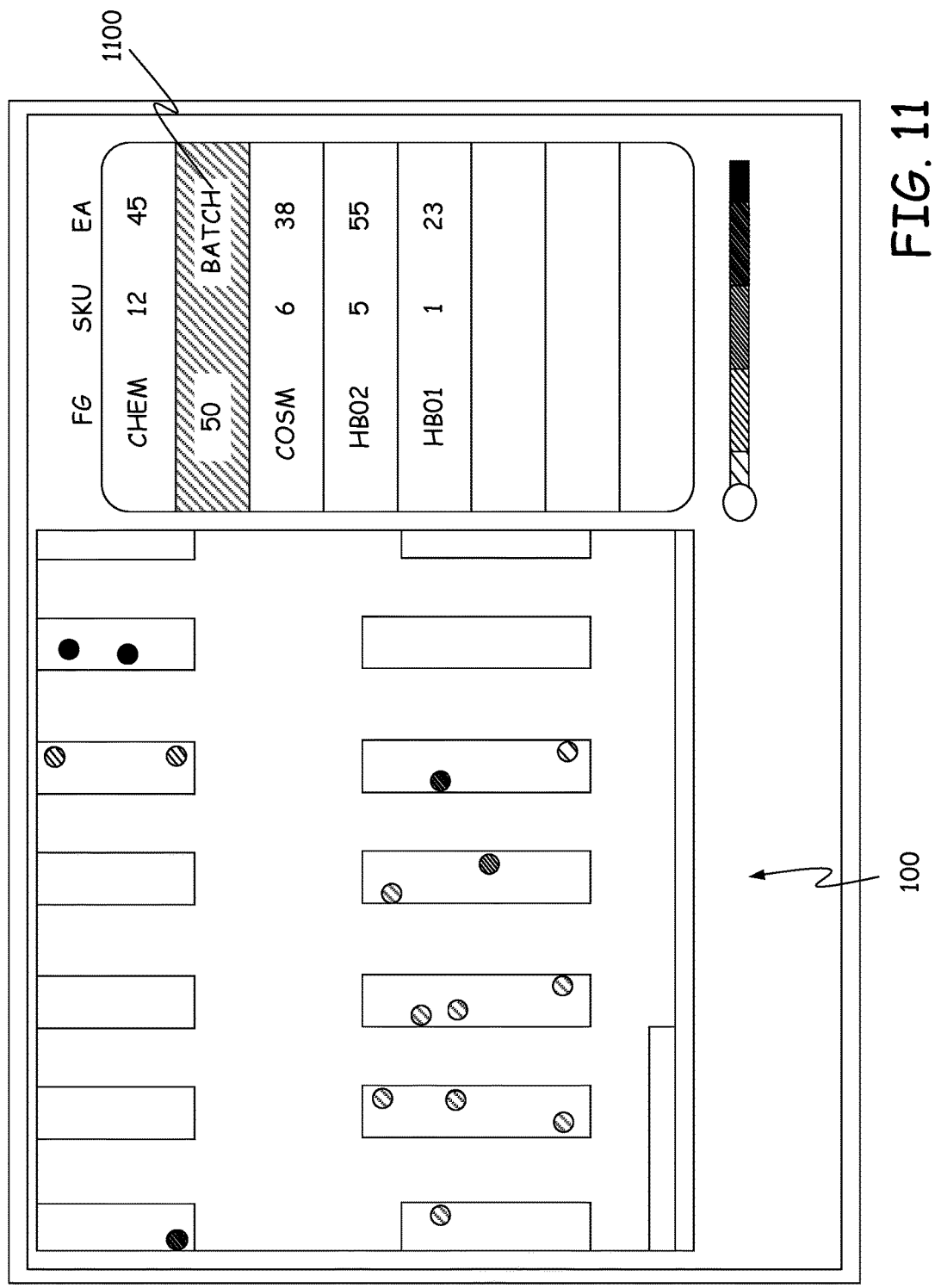
FIG. 11 provides a user interface on a mobile device showing a control for requesting restocking.

In addition to conveying the current restocking needs of products in a retail store, stock status API 314 also generates user interface 100 such that a user is able to request that a restocking task be set for a fill group. In the embodiment of FIG. 11, a user makes this request by first swiping a fill group entry, such as fill group entry 122, to the left to expose a restocking request control 1100, which is designated as "BATCH". When a user selects restocking request control 1100, stock status API 314 sends the store ID and an identifier for the fill group in a batch request to status backend API 318 at step 612 of FIG. 6.

Upon receiving the batch request at step 612, status backend API 318 sends a restock task request to workload API 326 at step 614. This restock task request includes the store ID and the fill group identifier. After sending the restock task request, status backend API 318 stores a restock request start time in status database 320 at step 615. This start time is reflects when the status backend API 318 received the batch request and is used to keep track of how long the restocking task has been pending.

Based on the restock request at step 614, workload API 326 sets a restocking task for workers in a backroom by communicating with a task API 360 on a mobile device 312 used by the backroom workers. This task is transmitted to task API 360 at step 616.

Figure 12:
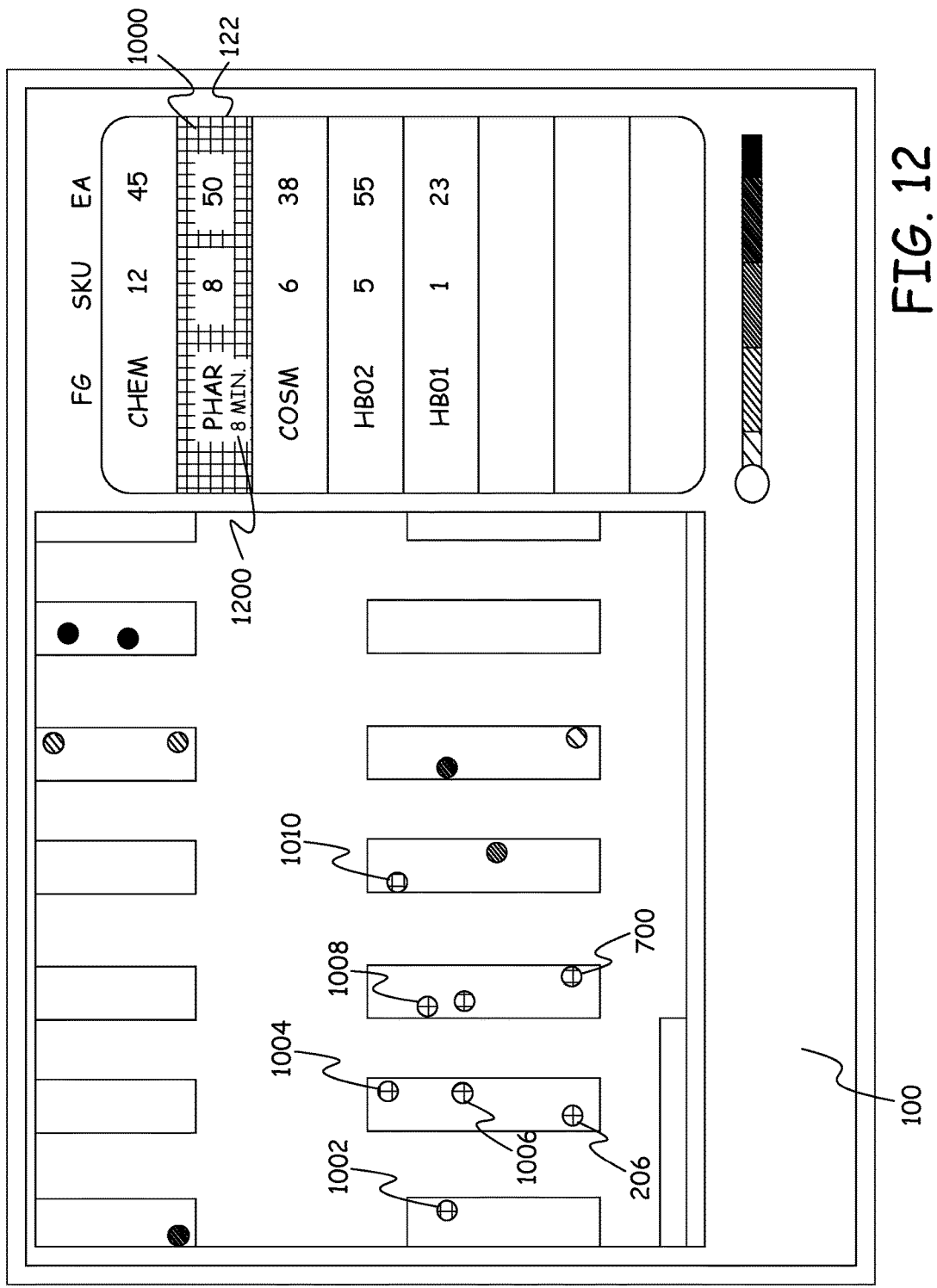
FIG. 12 provides a user interface on a mobile device showing a fill group after a restocking request.

After stock status API 314 sends the batch request at step 612, it updates user interface 100 as shown in FIG. 12. In particular, user interface 100 is updated so that the background of the fill group entry associated with the batch request, such as background 1000 of entry 122, is changed to a different color to indicate that a restocking task has been set for the fill group. In addition, each of the flags associated with the fill group are changed so that their color matches the color of background 1000 of the fill group entry. For example, flags 1002, 1004, 1006, 1008, 1010, 204, 206 and 700, which are associated with fill group entry 122, have their color changed to match background 1000 as shown in FIG. 12.

In addition, a restocking progress time 1200 is displayed in the fill group entry. This restocking progress time is returned by status backend API at step 610 in response to each update request. The restock progress time 1200 indicates the amount of time that has passed since the user selected the batch control for the fill group and is calculated as the difference between the time value stored in step 615 and the current time of the latest update request. Restock progress time 1200 allows the user to monitor whether the task is being performed in a timely manner and helps the user determine whether to request a restocking task for other fill groups. For example, if the user has previously requested a restocking task for a number of fill groups and the time for restocking has grown quite large, the user will not overburden the backroom employees by assigning an additional restocking task and may instead assign additional personnel to assist in the restocking. By placing the restocking time on the same user interface 100 used to reflect the current restocking need in the store, the embodiments described herein provide a more efficient computing system since the user is not required to open separate applications to determine when the restocking task was assigned.

Figure 13:
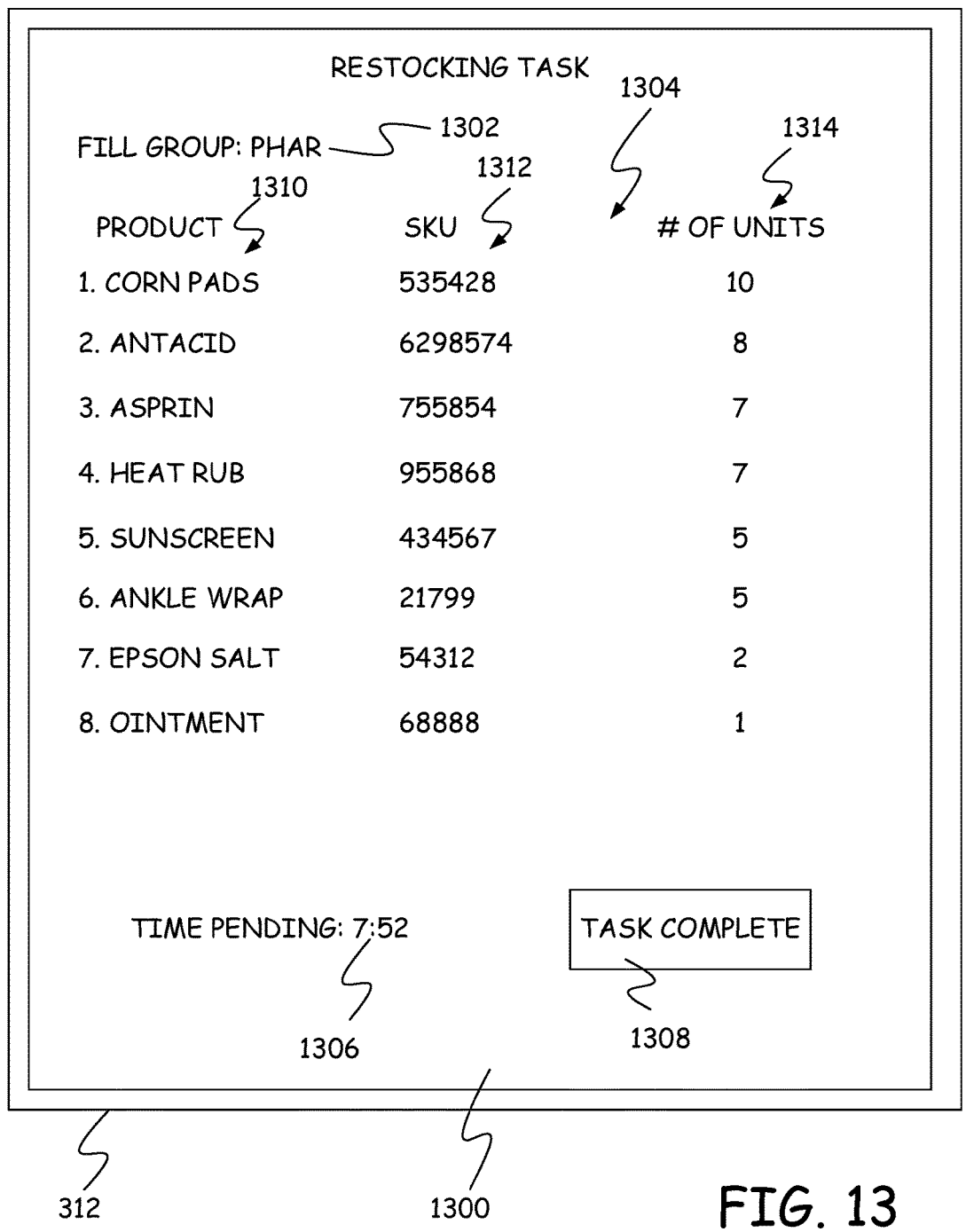
FIG. 13 provides a user interface on a mobile device showing an assigned restocking task.

FIG. 13 provides an example of a user interface 1300 displayed on mobile device 312 for the restocking personnel. User interface 1300 includes information about the restocking task including the fill group 1302 that is being restocked, a list 1304 of products in the fill group that need to be restocked, a field 1306 showing the time pending for the restocking request and a task complete control 1308. Restocking list 1304 includes a product name 1310, a product ID 1312 and a number of units needed on the sales floor 1314 for each product in the product list. The time pending field 1306 reflects the time that has elapsed since the restocking request was made through stock status API 314. When the employees have completed some aspect of the restocking task, for example by loading carts to be taken to the sales floor, the employees can select task complete 1308, which causes task API 360 to transmit a task done message at step 618. The transmitted task done message is provided to workload API 326, which in response sends a task complete message at step 620 to status backend API 318. The task complete message 620 includes an identifier of the fill group and the store ID.

Figure 14:
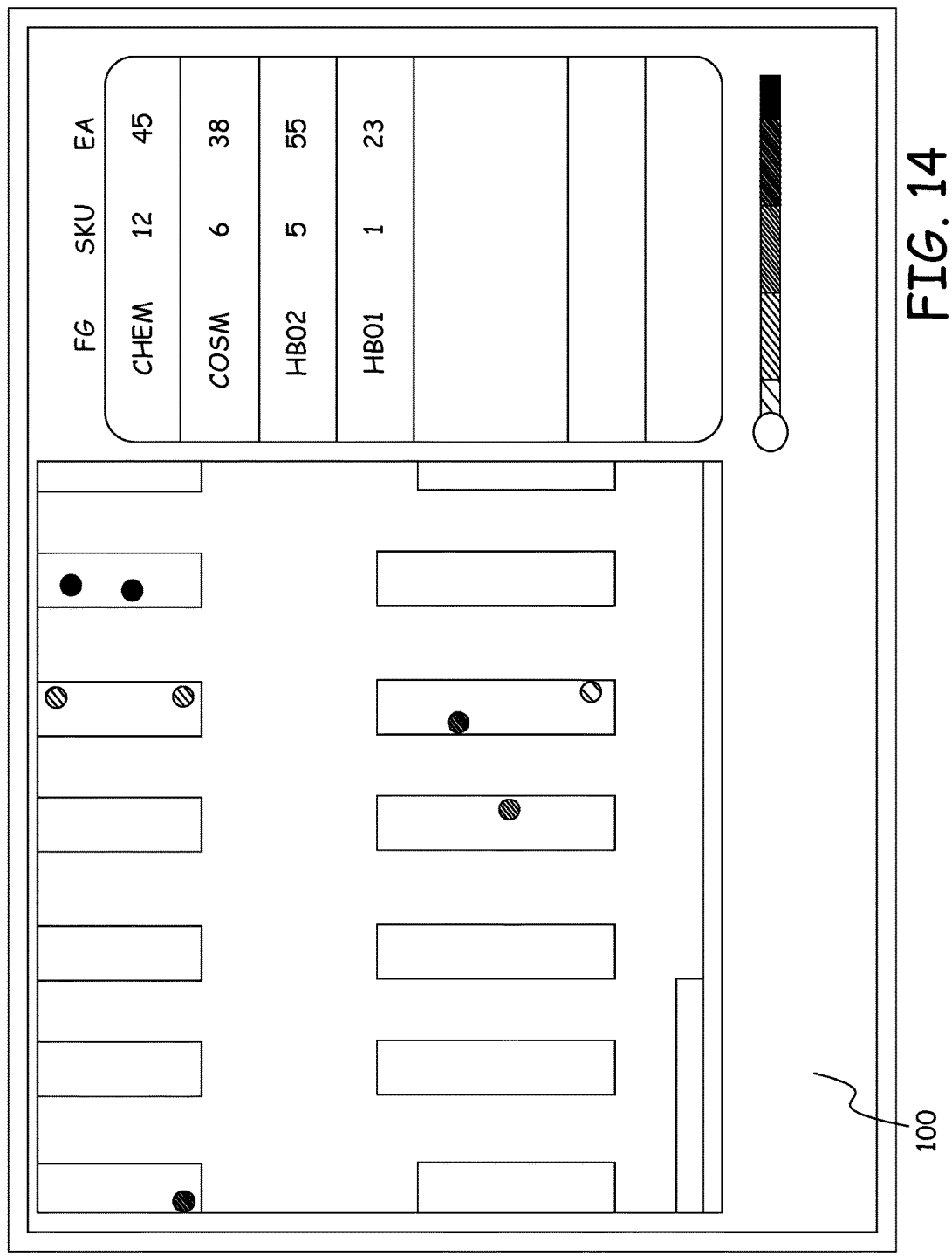
FIG. 14 provides a user interface on a mobile device showing the removal of a fill group after restocking is complete.

Based on the task complete message, status backend API 318 removes the fill group for the completed task from status database 320. In addition, status backend API 318 removes all product information associated with products in that fill group. As a result, when stock status API 314 returns to step 604 to make a new update request, the information retrieved from status database 320 at step 608 will not include the removed fill group or the removed products in that fill group. As a result, the returned fill group information and product information at step 610 will not include the fill group or the products in that fill group and stock status API 314 will update user interface 100 so that it no longer includes flags for the removed products or a fill group entry for the removed fill group. For example, in FIG. 14, fill group entry 122 and product flags 1002, 1004, 1006, 1008, 1010, 204, 206 and 700, which were shown in FIG. 12 while the restocking task was pending, have been removed from user interface 100 because the restocking task was completed. Thus, user interface 100 is updated to remove product flags and fill group entries when restocking task have been completed.

Figure 15:
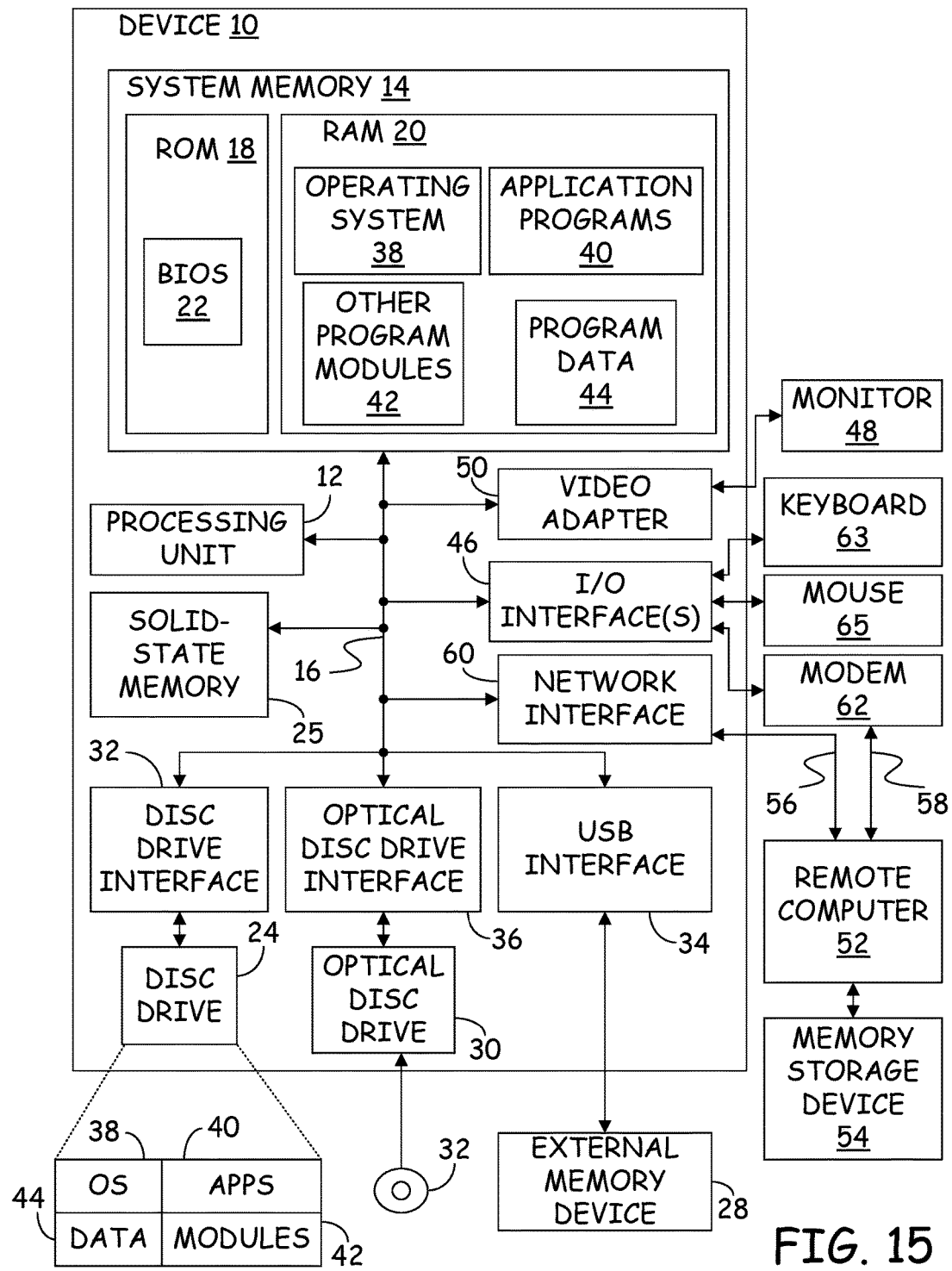
FIG. 15 provides a block diagram of a computing device that can be used as a server or mobile device in the various embodiments.

FIG. 15 provides an example of a computing device 10 that can be used as a server device or mobile device in the embodiments above. Computing device 10 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes an optional hard disc drive 24, an optional external memory device 28, and an optional optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include programs for implementing any one of map API 316, stock status API 314, status backend API 318, workload API 326, enterprise services API 324 and task API 360. Program data 44 may include data such as data in map database 317, status database 320 and workload data store 322, for example.

Processing unit 12, also referred to as a processor, executes programs in system memory 14 and solid state memory 25 to perform the methods described above.

Input devices including a keyboard 63 and a mouse 65 are optionally connected to system bus 16 through an Input/Output interface 46 that is coupled to system bus 16. Monitor or display 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 15. The network connections depicted in FIG. 15 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46. Order 206 is received through either network interface 60 or modem 62.

In a networked environment, program modules depicted relative to the computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 15 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A computer-implemented method comprising:
   displaying a plurality of fill group identifiers and a map on a user interface, each fill group identifier representing a separate collection of products that are restocked as a group, and the map comprising a plurality of flags, each flag indicating the location of a product that needs to be restocked;
   receiving a request through the user interface to set a restocking task for one of the fill groups; and
   when the restocking task is completed, updating the user interface so that the fill group identifier associated with the request is removed from the user interface and the flags for any products in the fill group associated with the request are removed from the map.

2. The computer-implemented method of claim 1 wherein displaying the plurality of fill group identifiers further comprises, for each fill group identifier, displaying a count of the distinct product types in the fill group that need restocking.

3. The computer-implemented method of claim 2 wherein displaying the plurality of fill group identifiers further comprises, for each fill group identifier, displaying a count of the total number of product units in the fill group that need to be restocked.

4. The computer-implemented method of claim 1 further comprising updating the user interface to show the amount of time that has passed since the request was received such that the amount of time is removed from the user interface when the fill group identifier associated with the request is removed.

5. The computer-implemented method of claim 1 wherein a flag is prevented from being displayed on the map for a product that needs restocking but that is not available in the retail store.

6. The computer-implemented method of claim 1 wherein at least one flag represents a group of different product types that each need restocking.

7. The computer-implemented method of claim 1 further comprising receiving a selection of a flag and in response displaying an image of a product represented by the flag.

8. The computer-implemented method of claim 1 wherein each flag comprises a color that indicates a degree to which restocking is needed for the product that the flag represents.

9. The computer-implemented method of claim 8 further comprising receiving a selection of a fill group through the user interface and in response changing the color of all flags for products in the fill group to a same color.

10. The computer-implemented method of claim 8 further comprising in response to the received request, changing the color of all flags for the products in the fill group to a same color.

11. A computer-implemented method comprising:
    displaying a user interface showing colored pins on a map and a list of fill groups, each colored pin representing a location of at least one distinct product type that requires restocking and each fill group representing a respective collection of distinct product types where at least one of the distinct product types in the collection requires restocking, wherein the color of the colored pins indicates a degree to which restocking is needed and wherein two of the colored pins have different colors but represent locations of two respective product types of a single fill group;
    receiving an instruction through the user interface to set a restocking task to restock a fill group; and
    causing a restocking task to be set in response to the received instruction.

12. The computer-implemented method of claim 11 further comprising receiving an indication of a selection of a fill group in the user interface and in response changing the colors of all of the pins associated with product types in the fill group to a same color.

13. The computer-implemented method of claim 12 further comprising in response to receiving the instruction to restock the fill group, changing the colors of all of the pins associated with product types in the fill group associated with the instruction to a same color.

14. The computer-implemented method of claim 11 further comprising removing the fill group associated with the instruction from the list of fill groups after the restocking task has been completed.

15. The computer-implemented method of claim 11 further comprising receiving a selection of a pin and in response displaying an image of a product type associated with the pin.

16. A system comprising:
- a first mobile device configured to display a map indicating which products need restocking and to display a restocking request control for a fill group representing a collection of products that are restocked as a group, wherein upon selection of the restocking request control, the first mobile device transmits a restocking request for the fill group;
- a server, configured to receive the transmitted restocking request and in response cause a restocking task for the fill group to be transmitted; and
- a second mobile device configured to receive the transmitted restocking task and to display a user interface indicating the products in the fill group that need to be restocked as a group.

17. The system of claim 16 wherein the second mobile device is further configured to display a task complete control and upon receiving a selection of the task complete control to transmit a task complete message that causes an identifier for the fill group to be removed from the display of the first mobile device.

18. The system of claim 16 wherein the first mobile device is configured to display a map with flags for products that need restocking, each flag having one of a plurality of colors, where each color is associated with a different degree of needed restocking.

19. The system of claim 18 wherein upon selection of the restocking control all of the flags of the products associated with the fill group are changed so that the flags have a same color.

20. The system of claim 18 wherein at least one flag represents a plurality of different product types that need restocking.

* * * * *